United States Patent
Budel et al.

(10) Patent No.: US 10,688,725 B2
(45) Date of Patent: Jun. 23, 2020

(54) 3D PRINTER AND METHOD FOR LIMITING MATERIAL ACCRETION

(71) Applicant: ATUM HOLDING B.V., Waddinxveen (NL)

(72) Inventors: Tristram Budel, Tilburg (NL); Ramon Rudolf Tetteroo, The Hague (NL); Chanil Budel, Hoorn (NL)

(73) Assignee: ATUM HOLDING B.V., Gouda (NL)

( * ) Notice: Subject to any disclaimer, the term of this patent is extended or adjusted under 35 U.S.C. 154(b) by 29 days.

(21) Appl. No.: 16/313,300

(22) PCT Filed: Jun. 19, 2017

(86) PCT No.: PCT/NL2017/050405
§ 371 (c)(1),
(2) Date: Dec. 26, 2018

(87) PCT Pub. No.: WO2018/004336
PCT Pub. Date: Jan. 4, 2018

(65) Prior Publication Data
US 2019/0152153 A1    May 23, 2019

(30) Foreign Application Priority Data

Jun. 27, 2016  (NL) .................................... 2017052

(51) Int. Cl.
*B29C 64/386*  (2017.01)
*B33Y 50/02*   (2015.01)
*B33Y 10/00*   (2015.01)

(52) U.S. Cl.
CPC ............ *B29C 64/386* (2017.08); *B33Y 50/02* (2014.12); *B33Y 10/00* (2014.12)

(58) Field of Classification Search
None
See application file for complete search history.

(56) References Cited

U.S. PATENT DOCUMENTS

| 2009/0139891 | A1* | 6/2009 | Oshima | B32B 38/145 |
| | | | | 206/497 |
| 2014/0107823 | A1 | 4/2014 | Huang | |
| 2016/0009028 | A1* | 1/2016 | Tjellesen | B29C 64/20 |
| | | | | 425/375 |
| 2018/0354195 | A1* | 12/2018 | MacCormack | B29C 64/209 |

OTHER PUBLICATIONS

International Search Report and Written Opinion, dated Sep. 27, 2017, Application No. PCT/NL2017/050405, Filed Date: Jun. 19, 2017, pp. 8.

* cited by examiner

*Primary Examiner* — Ryan A Jarrett

(57) ABSTRACT

A 3D printer and a method implemented therein for limiting inherent material accretion which may result during the 3D printing and which results in deformations relative to a desired form for printing. Two mechanisms are disclosed for this purpose. For example, on the basis of a provided model one mechanism includes compensating the model for inherent accretion and generating layers for printing for the 3D printer on the basis of the compensated model. Another mechanism includes generating layers for printing for the 3D printer on the basis of the model and compensating the layers for printing for inherent accretion.

14 Claims, 4 Drawing Sheets

3D PRINTER AND METHOD FOR LIMITING MATERIAL ACCRETION

This is a national stage application filed under 35 U.S.C. § 371 of pending international application PCT/NL2017/050405 filed Jun. 19, 2017, which claims priority to Netherlands Patent application NL 2017052, filed Jun. 27, 2016, the entirety of which applications are hereby incorporated by reference herein.

The present disclosure relates to a 3D printer and a method implemented therein for limiting inherent material accretion which may result during the 3D printing and which results in deformations relative to a desired form for printing.

Bleeding is the undesired accretion of printing material outside a form of an object for printing. In the case of printing with a laser printer, bleeding is the accretion of solid material resulting from diffusion and illumination or passage because the materials for printing are transparent to some extent. Thermal printers and 3D printers on the basis of principles other than curing of printing material can also suffer from bleeding. The degree of diffusion and transmission depends on the light path, diffusion, transmission and the like. The curing excitation, such as the laser or other light source, heat and the like, penetrates deeper than intended into the printing material for curing, which results in undesired accretion. In the case of 3D stereolithography this material can accrete both in the z direction and in the x and y direction. Repeatedly constructing layers on each other allows a small amount of light to penetrate through the material repeatedly, this in each case causing a small amount of accretion. After having printed a determined number of layers the overall resulting printed layer, then with the undesired accretion, has then become so thick and, with this, the light transmission has become so low, that insufficient light is passed for accretion of material.

The transmission coefficient and the sensitivity of the material to bleeding are material-dependent. These are values which can be measured on the basis of determined 3D models or can be determined through tests.

It is recognized that it is known from US-2014/107823 to compensate for shrinkage after printing by overdimensioning the model for printing, so that after printing and the shrinkage occurring after printing the product obtains the desired form which was to be printed originally. It is thus described in paragraph 127 of this publication that the model must be overdimensioned in order to compensate for the shrinkage occurring after printing.

The present disclosure relates to a completely different problem, which to the best knowledge of the inventors of the present disclosure has gone wholly unrecognized in the literature and which does indeed result in unacceptable deformation of printed products relative to a desired form, more particularly increased deformation, which results from the process of printing itself, for instance due to diffusion and due to an excitation, such as laser or heat, being passed (transmitted) too deep into printing material which is for instance cured layer by layer during the printing process in order to form the product for printing. The present disclosure thus relates to undesired accretion of material outside a desired form during the printing process, while US-2014/107823 relates to a problem of shrinkage of printed material after the printing process.

In this context it is emphasized that the problem of shrinkage cited in US-2014/107823 is wholly inherent to the printing material used. The problem of undesired accretion conversely results not only from the printing material used, but also from properties and/or settings of a printer applied in the printing process, such as laser intensity or heat intensity, wherein there are many possibilities for finding the solution to problems in respect of undesired accretion and overdimensioning in such settings and properties of the applied printer. Because it is associated with the printing material used, shrinkage is further omnidirectional, while undesired accretion is a result of the radiation direction of the excitation, such as the laser or heat, and of diffusion of this excitation, and for these reasons skilled persons will deem the problems of shrinkage and of undesired accretion, which was not previously recognized, as wholly unrelated aspects.

In addition, it is noted here that diffusion and passage result in accretion linked to the radiation direction of the excitation. Shrinkage is conversely at least approximately omnidirectional and possibly determined only by local thickness of printed products. Taking into account diffusion and passage is far from omnidirectional, and requires a completely different approach.

The problem of undesired accretion underlying the present disclosure is further elucidated below. In FIG. 7 arrow A indicates the construction direction of a 3D printer, which is oriented from top to bottom in the figure. The layers of objects 9, 10 lying at the top in the figure are printed first as according to the direction of arrow A, the layers toward the tip of arrow A are printed later, and the layers at the bottom of the figure are printed last. Particularly the printing of the printing material around a hole 11 in order to obtain a shape formed precisely as specified (for instance exactly circular) was a not inconsiderable problem in 3D printing technology in the past. Nowadays, 3D printers are utilized increasingly more widely, although fields of application in which an exact dimensioning is of crucial importance, such as dentistry, are still experiencing considerable problems, precisely in respect of resulting dimensioning and a lack of accuracy thereof, this causing great problems in use in additional and other fields of application.

The object of the present disclosure is to prevent overdimensioning of a printed product relative to the model which was meant to be printed. Bleeding is the undesired accretion of material which results in a dimensional variation, more particularly overdimensioning, in the printed model relative to the original digital model. This is in contrast to the above cited prior art, which relates to compensation of shrinkage occurring after the printing process.

The present disclosure relates to the measure that parts of the model, which are made thicker due to bleeding, are printed thinner. By taking into account the natural inherent accretion which occurs, the printed object will then obtain the correct size in accordance with the model on which it is based.

Pixels which can thus be printed by the previously unintended accretion at or of an underlying layer, as seen in the printing direction, thus need not be printed. These pixels can be removed from the model and/or be omitted ("blacked out") in the previous slices, which are printed before an outer surface of the product for printing, so that there locally curing of the printing material, for instance polymerization, takes place exclusively up to the outer surface.

The object of the correction of this phenomenon of bleeding is to obtain a dimensionally stable and accurate print.

With this method round holes 11 can be printed irrespective of the orientation of the hole in the model, while conventionally this has always been a great problem with 3D printers. By applying this method not only to the holes in the model but over the whole model, the model as a whole is realized with a smaller variation relative to the "master" in the form of the digital model.

The main object of this disclosure is then thus the compensating of bleeding by not printing determined parts of the model precisely because they are constructed by means of bleeding and thus need not be printed, because printing of these parts would result in bleeding outside the outer surfaces of the product relative to the desired forms in accordance with the model.

These objects can be achieved in diverse ways. This is because there are diverse ways to ensure that the parts which are formed by bleeding are not or need no longer be printed.

Figure 1:
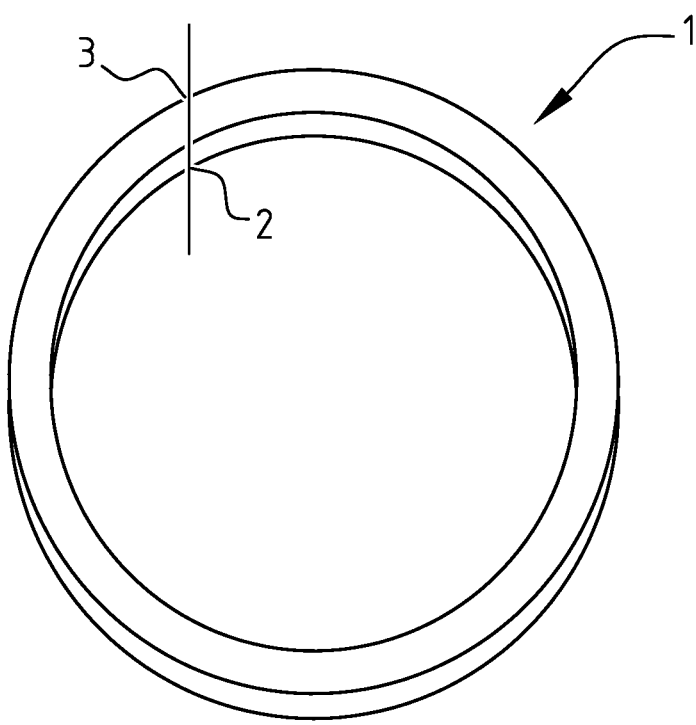
FIG. 1 depicts a model of a ring without transformations, accretion, or compensation.

Model Bleeding Correction Algorithm:

1. Initially provided is a model of the object for printing, in FIGS. 1-4 a ring 1, without taking into consideration undesired material accretion, and thus without corrections. FIG. 1 shows a model of the ring without transformations, accretion or compensation therefor. Determined for each vertical section is:

Lowest point (2)=X:0,Y:0,Z:10
Highest point (3)=X:0,Y:0,Z:11

Figure 2:
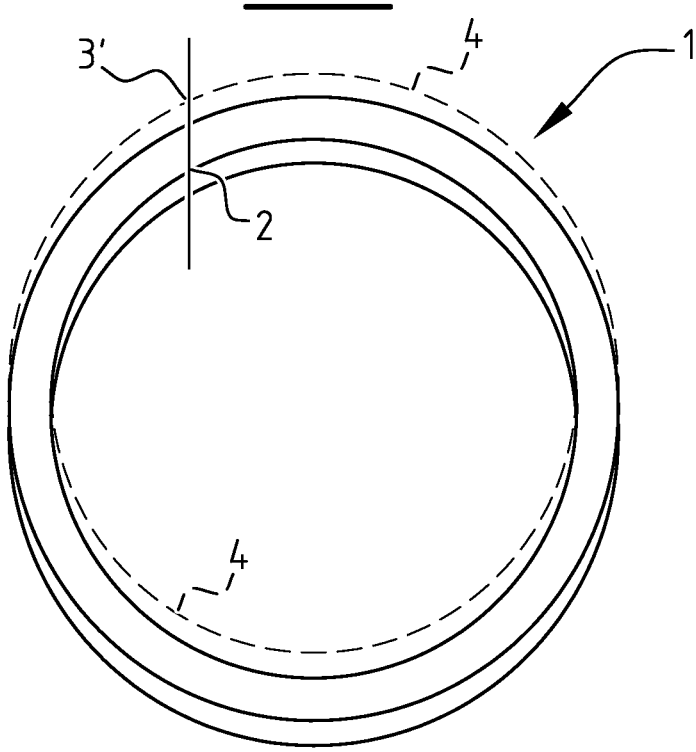
FIG. 2 depicts the effect of bleeding when a printer prints up to the boundaries of the model according to FIG. 1.
Figure 3:
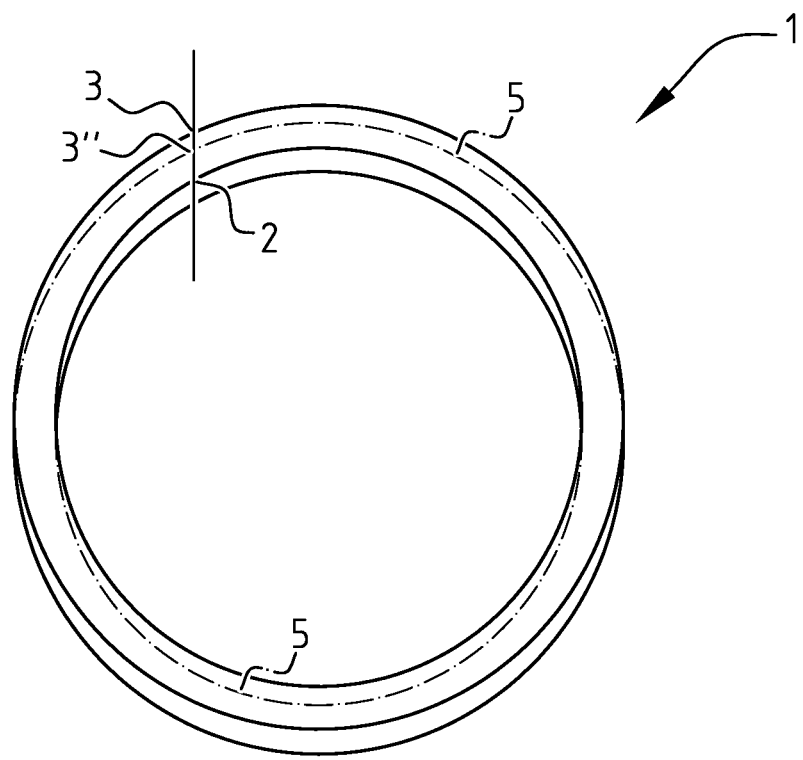
FIG. 3 depicts a boundary up to which 3D printing must take place in the circumferential shape of the ring shown in FIG. 1 in order to achieve the originally intended shape of the ring, taking into consideration the inherently occurring accretion.
Figure 4:
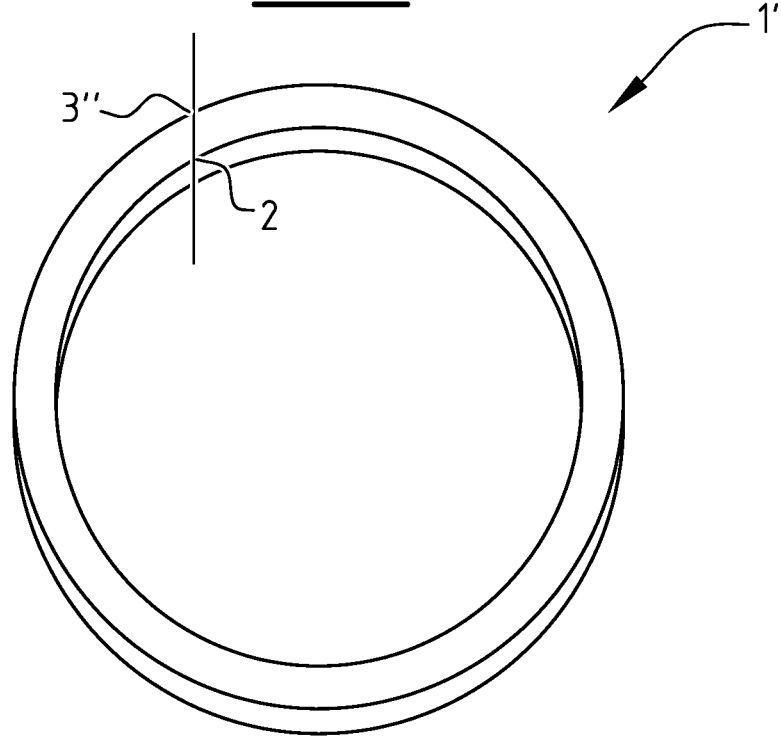
FIG. 4 depicts a ring printed up to the boundary of FIG. 3.

FIG. 2 shows the effect of bleeding: when the printer prints up to the boundaries of the model according to FIG. 1, accretion designated with broken lines 4 results, which is undesirable.

2. Determine the layers/model points which, if printed, will cause the bleeding
   a. Algorithm:

Points to be corrected $(P_c)$=All points having a Z-normal of +1 (in upward direction) $(P_z)$ and having a lower/starting layer $(L_1)$ which is thicker than the bleeding correction $(B_c)$ $P_c=P_z \ \& \ (L_1>B_c)$ Top:
Lowest point (2)=X:0,Y:0,Z:10
Highest point (3) $(P_c)$=X:0,Y:0,Z:11,5
(assuming $B_c$=0.5)
Subsequently determined within the model of the ring 1 for printing is a boundary, indicated in FIG. 3 with broken lines 5, up to which 3D printing must take place in the circumferential shape of ring 1 in order to achieve the originally intended shape of ring 1 as shown in FIG. 1, taking into consideration the inherently occurring accretion. With this, the undesired accretion thus becomes an integral part of the printing process:

3. Determine the correcting points
   a. Algorithm:

Corrected points $(P_n)$=Points to be corrected $(P_c)$− Bleeding correction $(B_c)$ $P_n=P_c-B_c$ Top:
Lowest point (2)=X:0,Y:0,Z:10
$P_c$ (3' in FIG. 2)=X:0,Y:0,Z:11,5
$P_n$ (3" in FIG. 3)=X:0,Y:0,Z:10.5
(assuming $B_c$=0.5)
The model to be sent to the printer is then modified:
4. Alter the 'Points to be corrected $(P_c)$' of the model so that they are equal to 'Corrected points $(P_n)$'
   a. Algorithm: 'bleeding points'='bleeding correction points'

$P_c=P_n$

Top:
Lowest point=X:0,Y:0,Z:10
Highest point=X:0,Y:0,Z:10.5
(assuming $B_c$=0.5)
5. The sections or slices of the modified/transformed model can then be generated, if the printer for controlling thereof is based on slices, and be sent to the printer.

What is notable in this algorithm is that Bc is assumed known for this purpose. Values of Bc can be determined through tests and will be different for diverse factors and aspects, such as type of material, thickness of the section under accretion, intensity of laser or other curing printer elements, and so on. This will inter alia be further elucidated hereinbelow.

Figure 5:
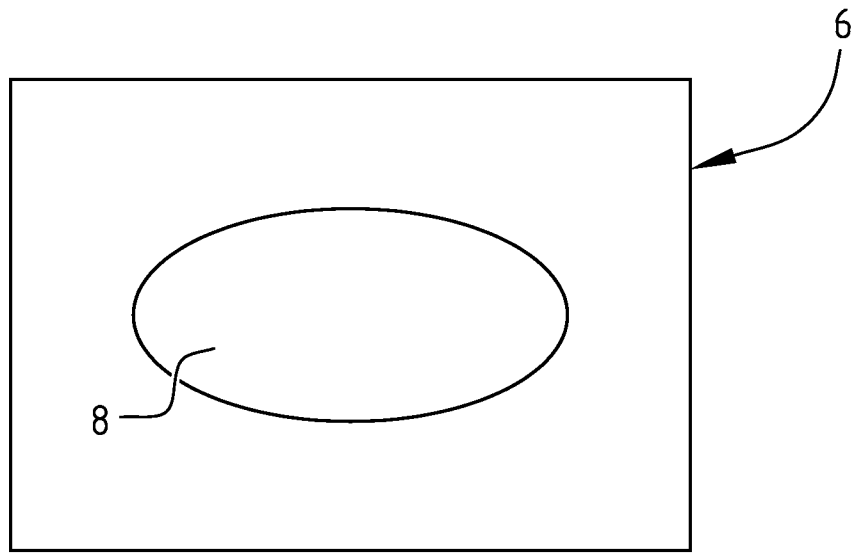
FIG. 5 depicts a slice/section 6.
Figure 6:
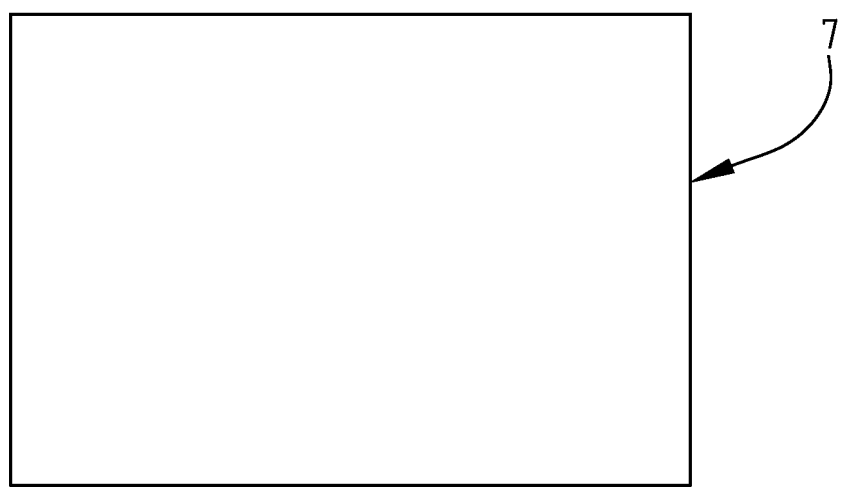
FIG. 6 depicts a slice/section 7, directly above slice 6 of FIG. 5.

Another algorithm is also further elucidated hereinbelow. This alternative algorithm is referred to here as the pixels/slices correction algorithm. FIG. 5 shows a slice/section 6 and FIG. 6 shows a slice/section 7, directly above slice 6 of FIG. 5. There is a (limited) distance between the slices/sections. FIG. 5 comprises product pixels 8, and FIG. 6 does not. The algorithm then runs as follows:
1. Generate the model without corrections, as it is meant to be printed.
2. Calculate all slices of the model
3. Determine and define the pixels to be corrected:
   a. Per layer, check whether the pixels in the form for printing are still present on the subsequent (superposed) layer as product element for printing.

Positions of pixels to be corrected $(P_c)$=Current layer of 'product pixels' $(P_w)$!=Superposed layer of 'non-product pixels' $(P_b)$ $P_c=P_w!=P_b$ 4. If the layer comprises pixels to be corrected, corrections are calculated as follows
   a. Determine the (underlying) slice on the basis of the following formula:

Start correction layer $(L_s)$=Current layer (in mm) $(L_c)$−Bleeding correction (in mm) $(B_c)$ The bleeding correction relates to a number of layers, the sum of intermediate distances of which equals the bleeding correction.

$L_s=L_c-B_c$

Convert de product pixels 'to be corrected' $(P_c)$ into non-product pixels in all layers starting at the 'Start correction layer' and end with the current layer $(L_h)$.

```
L_a = L_s
L_a != P_b {
    P_c = black
    L_a += 1 layer
}
```

5. Calculate the slices of the modified/transformed model.

Methods are thus provided of as it were transforming the model, taking into consideration the normally undesired accretion, such that parts are removed from the starting model, which parts are replaced by the accretion, which is thus no longer undesired but will form an integral part of the printing process. The correction can be based on the model itself, by transforming it and generating slices/sections thereof, or by determining the correction and incorporating it into previously generated slices/sections. As a third option, reference is here also made to a method wherein the model is copied, the copied model is translated (displaced) over a distance corresponding to the thickness of undesired accretion, and combined with the original model. This should be deemed as a method which is based on compensating of the model before printing layers or slices are generated therefrom. Printer instructions which have been compensated for the accretion are then generated from the resulting combined model.

Forms of bleeding can also take place in systems other than stereolithography. In for instance Selective Laser Sintering (SLS) accretion can take place due to thermal conduction of heat through the basic material, also on the basis of transmission and/or diffusion and so on. In Fused Deposition Modeling overhanging material may sag, which has the same net effect as bleeding. In Powder Bed Inkjet printing the UV and/or heat-curing ink can be used to have the powder particles penetrate deeper than is desirable into the powder bed by capillary forces. The net effect hereof can be compared to bleeding. The features according to the present disclosure likewise apply in such techniques.

Material dependence of the phenomenon of bleeding, specifically for stereolithography, is further discussed below by way of example. Not all printing materials are for instance equally transparent to laser or other light, and less diffusion and transmission will thus take place. It is proposed for this purpose that a database with bleeding properties of different printing materials is formed. A correction factor in respect of bleeding can be measured using determined 3D models or can be determined and recorded through tests. A 3D model with a number of horizontal cylinders therein can also be used for this purpose.

It is a consideration that the wall thickness of the product for printing on the basis of the model has to be thick enough, so that the wall thickness no longer influences the degree of bleeding. In a set of data, formed through tests, for predetermining an expected degree of bleeding to enable compensating therefor, it is possible to physically measure the bleeding of printed products relative to models on which they are based and then deduce therefrom a concrete value for the bleeding, and then apply this value in the intended compensation.

Figure 7:
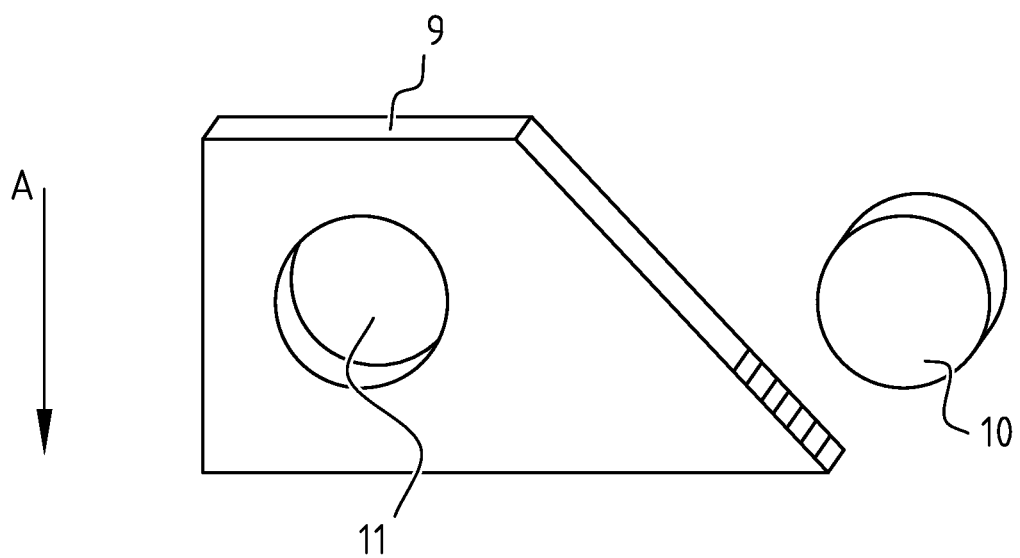
FIG. 7 depicts a construction direction of a 3D printer.

The diameter of the round hole 11 in FIG. 7 is for instance known from the digital model. The roundness of the hole and the diameter are then measured in the z direction of the print, resulting in:

$Bc$=hole digital−measured value

This is then repeated an x number of times, distributed over different locations of the total printing area, which produces an average value.

The printer can have variations in radiation intensity, distributed over the whole light field. Measurements and experience of the inventors of the present disclosure have shown that this variation is usually less than 10%. On the basis of these measurement results it is thus also possible to compensate the light field. By lower illumination of some parts of the printing area than of others, the total dose on the printing area can be equalized.

After these diverse constants have been determined, they can be stored in a material database. Each material has its own constant.

It is further possible to influence the depth to which the phenomenon of bleeding occurs. It is for instance possible to add a pigment. Adding light-absorbing pigments or colorants enables the light penetration depth to be reduced. It is important here that the colorants and/or pigments absorb in the active bandwidth of the catalyst. If use is for instance made of a blue colorant/pigment which does not absorb in the absorption range of the catalyst, the light will penetrate the material to be polymerized as if no colorant were present.

Pigments otherwise have a slightly different effect than colorants. Because pigments are solid particles, they may cause diffusion/scattering. This scattering ensures a smaller penetration depth as seen from the radiation angle of the light source, but more bleeding will take place in the x, y direction, i.e. transversely of the printing direction, due to the scattering caused by these particles.

In addition, it is possible to use a so-called inhibitor. An inhibitor will inhibit the action of the catalyst. Owing to the presence of a catalyst in combination with an inhibitor, the catalyst and inhibitor co-act as a colorant. In this way the catalyst will inhibit the penetration depth of the light, but will not cause polymerization.

It is further possible to influence the light source-dependent light penetration depth. There is usually a relation between the radiation spectrum and penetration depth.

All of these influences can result in more tables per material, or simply in other tables for the same material with different additives, pigments, inks, colorants, laser intensities and so on.

The following is an example of a correction table in respect of bleeding.

| Narrow band illumination | | | |
| --- | --- | --- | --- |
| Material | λ (nm) | $E_c$ (mJ/cm$^2$) | $B_C$ (mm) |
| MS Black | 400-407 | | 0.35 |
| 3DM Orange | 400-407 | | 0.15 |
| Ti Cast | 400-407 | | 0.12 |

| Broad band illumination | | | |
| --- | --- | --- | --- |
| Material | λ (nm) | $E_c$ (mJ/cm$^2$) | $B_C$ (mm) |
| MS Black | 400-700 | | 0.45 |
| 3DM Orange | 400-700 | | 0.35 |
| Ti Cast | 400-700 | | 0.17 |

There are many other usable materials, although the foregoing example suffices to be able to put into practice the principles of the present disclosure. This is because it is perfectly clear from the tables above that there is a substantial difference between illumination with a narrow bandwidth and a broad spectrum, and that the bleeding is material-dependent.

The width of the illumination spectrum λ (nm) can thus be a relevant aspect for determining penetration depth of bleeding. Measurements show that the narrower the spectrum with which the resin is illuminated and the shorter this wavelength, the shorter the overall penetration depth and bleeding. The bleeding thus depends on the spectrum used for illumination.

The radiation dose (Ec) with which a layer is constructed in $mJ/cm^2$ can be equated to the light intensity times the illumination time.

Measurements have further shown that each material has its own bleeding constant at each radiation dose (Ec). This was measured on different days, if the illumination intensity and the illumination time are kept the same, the resulting bleeding will always be the same.

Claims will now follow the foregoing description of embodiments of the present disclosure, to which the scope of protection is not limited.

The invention claimed is:

1. A method of controlling a 3D printer for printing a product, comprising:
    providing a model of the product;
    compensating the model for inherent accretion resulting in printing material during printing from passage and diffusion of an excitation; and
    generating layers for printing in the printing material for the 3D printer on the basis of the compensated model,
    wherein compensating of the model comprises reducing the model in a direction of the inherent accretion linked to a radiation direction of the excitation by a dimension corresponding to a degree of inherent accretion.

2. The method as claimed in claim 1, wherein the degree of inherent accretion depends on at least one of: a type of printing material; an additive; a bandwidth of light; an intensity of light; a temperature; and ambient light.

3. The method as claimed in claim 2, wherein the additive is selected from the list consisting of a pigment, a colorant, and an inhibitor.

4. The method as claimed in claim 1, further comprising compiling a table of values of the inherent accretion for at least one printing material and a plurality of circumstances which determine the degree of inherent accretion in the relevant material.

5. The method as claimed in claim 1, wherein the inherent accretion results from at least one of: transmission; diffusion; conduction; and capillary action.

6. The method as claimed in claim 1, wherein the excitation is selected from the list consisting of laser and heat.

7. A method of controlling a 3D printer for printing a product, comprising:
    providing a model of the product;
    generating layers for printing in the printing material for the 3D printer on the basis of the model; and
    compensating the layers for printing for inherent accretion resulting in printing material during printing from passage and diffusion of an excitation,
    wherein compensating of the layers for printing comprises removing pixels for printing in the layers for printing in a direction of the inherent accretion linked to a radiation direction of the excitation to a depth of the outer surface of the product for printing corresponding to the degree of inherent accretion.

8. The method as claimed in claim 7, wherein the degree of inherent accretion depends on at least one of: a type of printing material; an additive; bandwidth of light; intensity of light; temperature; and ambient light.

9. The method as claimed in claim 7, further comprising compiling a table of values of the inherent accretion for at least one printing material and a plurality of circumstances which determine the degree of inherent accretion in the relevant material.

10. The method as claimed in claim 7, wherein the inherent accretion results from at least one of: transmission; diffusion; conduction; and capillary action.

11. The method as claimed in claim 7, wherein the excitation is selected from the list consisting of laser and heat.

12. A 3D printer comprising a printing element and a controller, wherein on the basis of a provided model, the controller is configured for at least one of:
    compensating the model for inherent accretion resulting in printing material during printing from passage and diffusion of an excitation, and generating layers for printing in the printing material for the 3D printer on the basis of the compensated model by reducing the model in a direction of the inherent accretion linked to a radiation direction of the excitation by a dimension corresponding to the degree of inherent accretion; and
    generating layers for printing in the printing material for the 3D printer on the basis of the model and compensating the layers for printing for inherent accretion resulting in printing material during printing from passage and diffusion of an excitation, by removing pixels for printing in the layers for printing in a direction of the inherent accretion linked to a radiation direction of the excitation to a depth of the outer surface of the product for printing corresponding to the degree of inherent accretion.

13. The 3D printer as claimed in claim 12, wherein the controller comprises a computer which is external to the 3D printer.

14. The 3D printer as claimed in claim 12, wherein the excitation is selected from the list consisting of laser and heat.

* * * * *